(12) United States Patent
Cox et al.

(10) Patent No.: US 7,250,610 B1
(45) Date of Patent: Jul. 31, 2007

(54) UV LIGHT DISINFECTION DEVICE

(75) Inventors: Raleigh L. Cox, Baton Rouge, LA (US); Christopher E. Cox, Denham Springs, LA (US); Michael David Catanzaro, Baton Rouge, LA (US); Kevin Michael Comeaux, Baton Rouge, LA (US)

(73) Assignee: Pentair Pump Group, Inc., Golden Valley, MN (US)

( * ) Notice: Subject to any disclaimer, the term of this patent is extended or adjusted under 35 U.S.C. 154(b) by 0 days.

(21) Appl. No.: 11/062,684

(22) Filed: Feb. 22, 2005

(51) Int. Cl.
  *G01J 1/00* (2006.01)
  *C02F 1/32* (2006.01)
(52) U.S. Cl. .............. 250/455.11; 250/504 R; 250/432 R; 250/436; 210/748
(58) Field of Classification Search ............ 250/504 R, 250/432 R, 455.11, 436; 210/198.1, 748
See application file for complete search history.

(56) References Cited

U.S. PATENT DOCUMENTS

| | | | | |
|---|---|---|---|---|
| 4,535,247 A | * | 8/1985 | Kurtz | .................. 250/436 |
| 5,266,215 A | * | 11/1993 | Engelhard | ............... 210/748 |
| 5,290,439 A | * | 3/1994 | Buchwald | ............... 210/198.1 |
| 5,372,781 A | * | 12/1994 | Hallett et al. | ............ 422/186.3 |
| 5,395,522 A | * | 3/1995 | Melanson et al. | ......... 210/202 |
| 5,505,912 A | * | 4/1996 | Hallett | ................ 422/186.3 |
| 5,540,848 A | * | 7/1996 | Engelhard | ................ 210/748 |
| 5,545,358 A | * | 8/1996 | Hallsten et al. | .......... 261/123 |
| 5,780,860 A | * | 7/1998 | Gadgil et al. | ........... 250/432 R |
| 5,916,439 A | * | 6/1999 | Oleskow | ................ 210/198.1 |
| 6,099,799 A | * | 8/2000 | Anderson | ................ 422/24 |
| 6,296,775 B1 | * | 10/2001 | Moody et al. | ............. 210/748 |

\* cited by examiner

*Primary Examiner*—Nikita Wells
*Assistant Examiner*—Johnnie L Smith, II
(74) *Attorney, Agent, or Firm*—Jones, Walker, Waechter, Poitevent, Carrere, & Denegre, L.L.P.

(57) ABSTRACT

A UV disinfection device having a contact chamber, the chamber being a container with an interior, a top portion and a bottom portion. A partition is positioned in the interior to form a first and second chamber, where the first and second chambers are in fluid communication near the bottom portion of the container. The container has an inlet in one of the first or second chambers, where the inlet is formed in the container near the top portion. The device includes an outlet in the other of the first or second chambers, and an ultraviolet lamp is positioned in either the first or second chambers.

8 Claims, 3 Drawing Sheets

INTERIOR
LIGHT ASSEMBLY

UV ASSEMBLY

UV LIGHT DISINFECTION DEVICE

BACKGROUND OF THE INVENTION

1. Field of the Invention

The present invention relates to disinfection systems for wastewater treatment systems, and particularly to a disinfection irradiation of the wastewater with ultraviolet light.

2. Description of Related Art

Many homes in rural and outlying areas are not connected to municipal water systems and rely on septic tank systems, aerobic treatment systems, small package plants or other types of local treatment apparatus (collectively "packaged plants") for wastewater treatment. These wastewater treatment systems are usually one or more tanks containing the treatment apparatus, connected to a field drip system or drainfield for ultimate disposal of the treated wastewaters. Treatment entails degradation of wastes in the waters by the biological processes of bacteria and micro-organisms. The discharged effluent will generally contain these bacteria and microorganisms.

Effluent quality produced by package plants is usually regulated by one or more governmental agencies. Many agencies require that the discharged wastewaters be disinfected to reduce the potential hazards caused by the presence of bacteria/microbes in the treated effluent. One common type of germicidal or disinfection treatment is chemical treatment with a chlorine type compound. Another common treatment is irradiation with ultraviolet light. It is known that irradiation of water with ultraviolet light within the range from about 150 nanometers through about 300 nanometers is effective in destroying microorganisms. See e.g. U.S. Pat. No. 5,019,256; U.S. Pat. No. 5,256,299; U.S. Pat. No. 5,422,487; or U.S. Pat. No. 5,624,573.

Both of these disinfection treatments require a separate "contact" chamber that is isolated from the wastewater treatment chamber to prevent sterilization or death of the treating bacteria within the treatment chamber (which would disrupt or stop the treating process). In the case of UV treatment, a UV contact chamber can be positioned at various locations within the discharge stream: within the treatment tank or a dosing tank or as a stand alone device between these tanks or after the dosing tank (if present) and prior to the drain field (note, some treatment systems may not include a drainfield). In any event, the owner or operator of the treatment facility must be able to access the contact chamber to service the fixtures, for instance, to replace the UV bulb as necessary. If the contact chamber is located outside a tank, the UV contact chamber must be accessible from the surface, as it will generally be buried in the ground.

One type of UV contact chamber is shown in U.S. Pat. No. 6,296,775, issued to Moody et al., hereby incorporated by reference. That device shows a UV lamp positioned in a "U" shape pipe. Influent enters on one side of the "U" and is treated on the other side of the "U", where after, the treated waters exit the contact chamber. The Moody device has disadvantages in that the "U" shape created a large foot print for the device, making it more labor intensive to install, either in the ground, or in the treatment tank itself. Further, the Moody device contains an insert for holding the UV lamp having opening to allow waters to pass through to reach the lamp for treatment. While the inlet keeps the UV lamp fixed in place, the openings can become clogged, requiring maintenance.

SUMMARY OF THE INVENTION

The apparatus is a single tube UV contact chamber, with an inlet and an outlet. The single tube is partitioned into two chambers, a first chamber and a second chamber. The chambers fluidly communicate in series: influent flows into the first chamber to the second chamber and then to an outlet. In one of the chambers is located a UV light adapted for purification. The tube has an access extension to allow a user to access the interior of the chamber containing the UV tube for repair/servicing of the apparatus.

OBJECTS OF THE INVENTION

It is an object of the invention to provide a UV contact chamber to treat wastewaters where the chamber has a small footprint.

It is an object of the invention to provide a UV contact chamber that is easily installed.

It is an object of the invention to provide a UV contact chamber constructed from readily available and economic material.

It is an object of the invention to provide a UV contact chamber that includes an air injector site.

DESCRIPTION OF THE INVENTION

Figure 1:
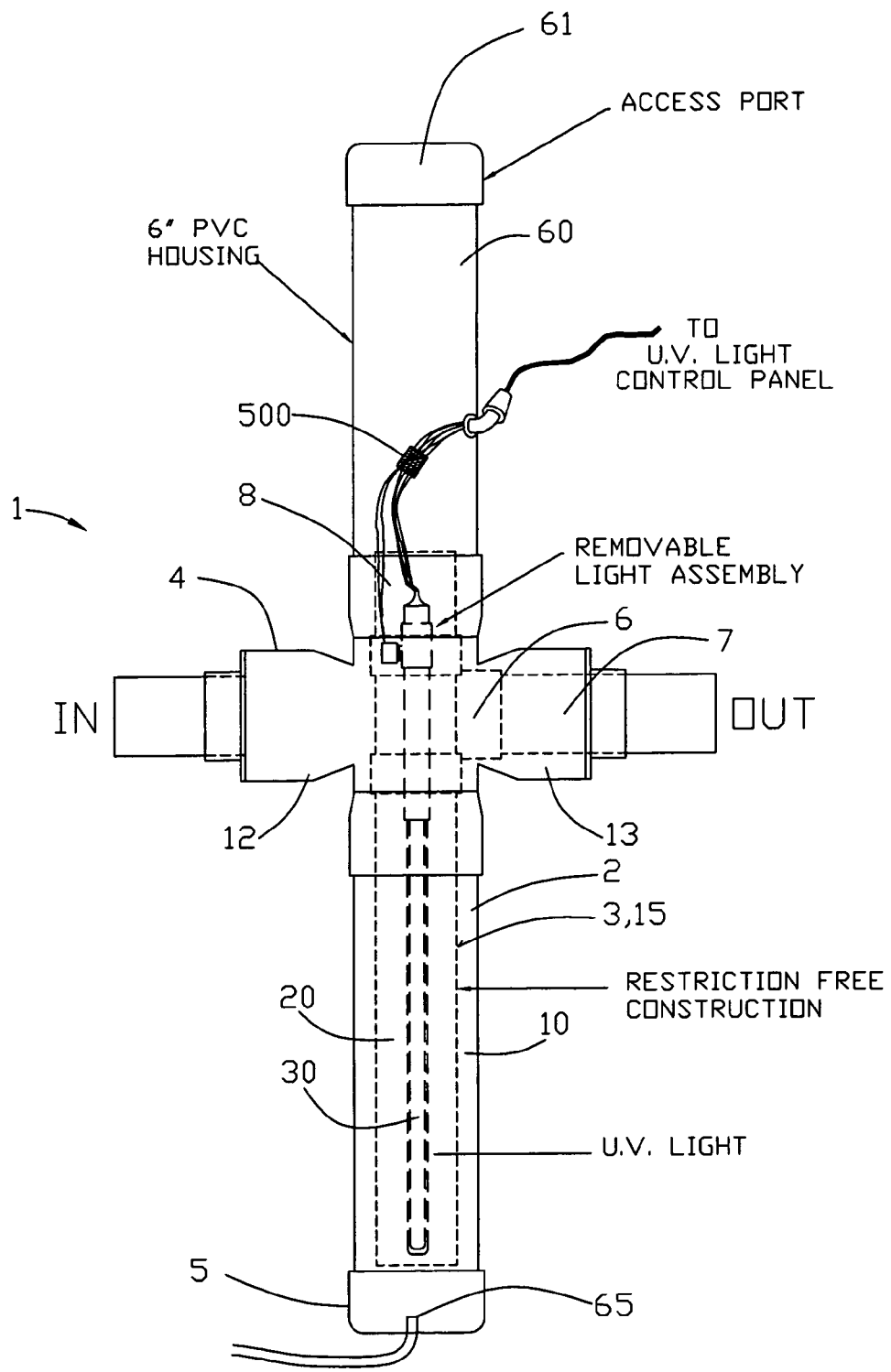
FIG. 1 is a front view of the device, showing details of the interior apparatus using dashed lines.

Shown in FIG. 1 is a cross section through a preferred embodiment of the UV contact chamber 1. The chamber 1 includes an outer container 2, cross fitting 4 and "T" fitting 6. As shown, the outer container 2 is formed by 6" polyvinyl chloride ("PVC") tube, having a "cross" PVC fitting 4 at its top end and a PVC cap 5 at the bottom end. The interior of the outer container 2 is partitioned into a first 10 and a second 20 chamber that are in fluid communication. The partition 3 in the preferred embodiment is formed by a 4" PVC tube 15 nested in the interior of the outer container 2. Hence, in this embodiment, the first chamber 10 is that volume between the 6" PVC tube and 4" PVC tube, while the second chamber 20 is that volume interior to the 4" PVC tube. The first chamber 10 and the second chamber 20 communicate through an opening in the partition 3 near the bottom end of the outer container 2. Here, the interior 4" PVC tube 15 is not capped at its bottom end and that bottom end is positioned above the cap 5 of the exterior tube, thereby allowing fluid communication through the interior tube's open bottom.

The interior PVC tube 15 is connected at its top end into a 4" PVC "T" fitting 6 that is positioned in the center of the interior of the outer 6" cross fitting. The remaining open ends of the "T" fitting 6 have sections of 4" PVC pipe joined, one 7 aligned with a horizontal arm of the outer cross fitting 4, and the other 8 aligned with upward arm of the outer cross fitting 4. This "fitting-in-fitting" configuration helps stabilize the interior tube within the exterior tube.

Positioned in the second chamber 30 is a UV lamp suitable for sterilization purposes (generally, emitting light at a wavelength within the range from 150 to 300 nanometers). Suitable lamps can be ordered from Atlantic Ultraviolet Corporation of Bay Shore, N.Y. One suitable model from Atlantic Ultraviolet is a "Ster-L-Ray" model #GPH620T5L/4, about 31 inches in length. The UV lamp 30 is mounted within the "T" shaped fitting 6 as shown in detail of that fitting in the cutaway view of FIG. 2.

Figure 2:
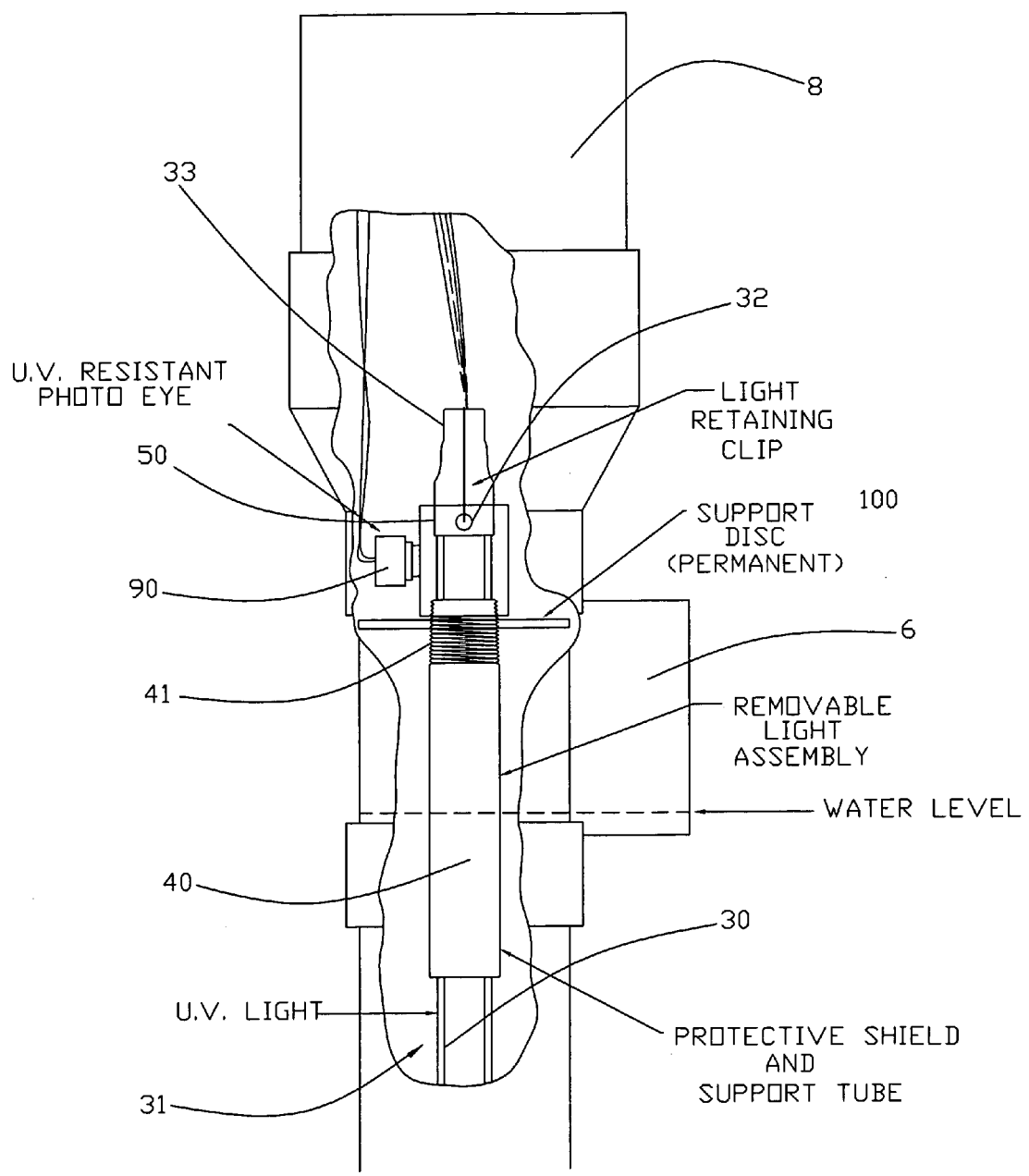
FIG. 2 is a horizontal cross section of the invention through the exterior cross fitting showing details of the UV lamp support structure.

As shown in FIG. 2, positioned in the top of the T" fitting 6 is a PVC annular support disk 100, having a center opening, As shown, the support disk 100 is fixedly attached to the interior of the fitting 6. Inserted through this disk 100 is the UV lamp 30 sheathed in a quartz tube (the clear quartz tube is used to protect the delicate UV lamp from the waters and to allow UV radiation to pass substantially unimpeded), collectively, the "lamp assembly" 31. Located immediately below the support disk 100 and surrounding/covering a portion of the lamp assembly 31 is a lower UV shield 40. The UV shield is a section of UV opaque and UV degradation resistant material, such as aluminum, copper or stainless steel (here, a 1" aluminum pipe). A UV shield is required to protect the PVC tubing located above the water level from exposure to UV radiation. UV radiation degrades PVC that has no intervening blocking or absorbing media, such as water. As shown, the lower UV shield 40 is about 6–8 inches in length, so that the bottom of the lower shield 40 is positioned below the water level in the interior chamber. In this particular embodiment, the lower UV shield 40 is sized to be slidable in the opening of the support disk 100.

The lower UV shield 40 has exterior threads 41 at its top end to mate with the interior threads of an upper UV shield 50, located above the support disk 100 (here, a 1" aluminum pipe fitting). The upper UV shield 50 is sized larger than the opening in the support disk 100. Hence, when lower UV shield 40 is threaded into the upper UV shield 50 and the assembled shields inserted into the support disk 100, the upper UV shield 50 rests on the support disk 100. Note, however, that the assembled shields can be slid upwardly and removed from the support disk 100 as the lower UV shield 40 is slidable in the support disk's center opening.

The UV lamp/quartz shield assembly 31 is slidable into the interior of the assembled shields (40 and 50), to allow the UV lamp assembly 31 to extend into the interior of the interior tube. The UV lamp 30 has a socket 32 at its tail end terminating in a four pin connector, all contained in a socket sheath 33 protecting the electrical connections. The lamp's electrical wiring can be connected to a plug connector 500 to ease removal of the lamp assembly from the contact chamber. Power is supplied to the lamp 30 generally through a cable to a ballast or transformer and ultimately to a control panel (not shown). Transformers may be required to provide proper voltage to the ballast.

The socket sheath 33 is slightly larger then the lamp assembly 31, and when the lamp assembly 31 is positioned in the shield assembly (40 and 50), the socket sheath 33 rests on a circular open ended retaining clip 510 positioned in the interior threads of the upper UV shield 50. This clip 510 supports the lamp assembly 31 to prevent further downward movement into the assembled shields. Note, however, that the lamp assembly 31 is upwardly slidable in the assemble shields (40 and 50).

Figure 3:
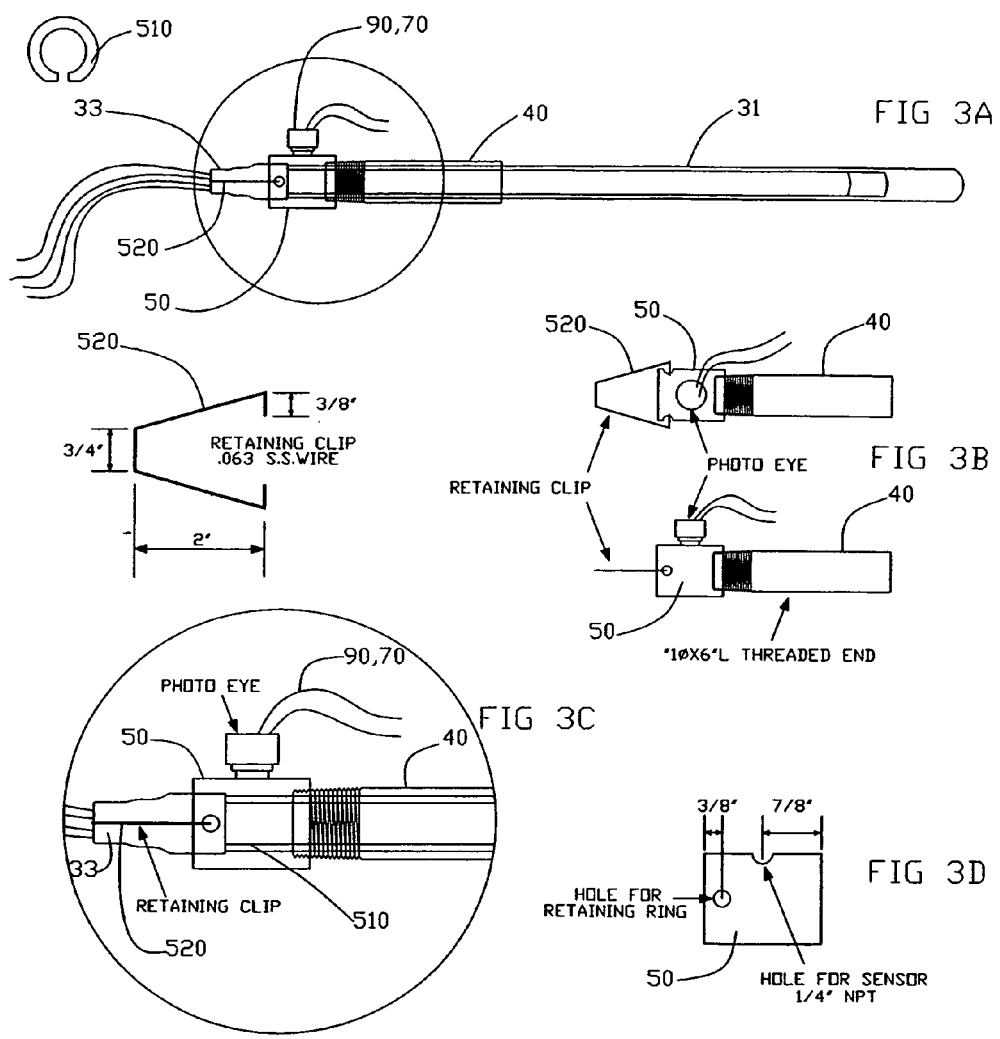
FIG. 3A is a front elevation showing the assembled lamp/shield assembly.
FIG. 3B is a front elevation of the shield assembly and lamp clip.
FIG. 3C is a detail of the top end of the lamp/shield assemble of FIG. 3A.
FIG. 3D is a front elevation view of the upper shield, showing openings for the clip and one embodiment of the UV light status circuit.

To prevent the lamp assembly 31 from being pushed out of the assembled shields by buoyant forces created by water in the interior chamber, a triangular shaped open end retaining clip 520 is used to clip the lamp assembly 31 to the upper UV shield 50. The top of the clip 520 is positioned over the socket end of the UV lamp 30, and the open tail ends of the clip 520 are inserted into holes in the upper UV shield 50 as shown in FIGS. 3A, 3B, and 3C. By use of a clip 520, the lamp assembly 31 and shield assembly (40 and 50) are coupled together, and the entire lamp/shield assembly can be slid upwardly through the support disk for removal from the contact chamber. Both upper shield 50 and lower shield 40 should be sized so that the entire shield/lamp assembly is of sufficient weight to resist buoyant forces, or weights would be needed.

Protecting the socket end 33 of the lamp 30 assembly is access container 60 (FIG. 1). Here access container 60 is a 6" PVC tube inserted into the top end of the cross fitting 4, and of sufficient length to protect the protruding electrical connections and to provide access to same depending on the setting. Installations internally within a treatment tank will require a smaller access container that would contact a chamber positioned exterior to a tank, where the access container would extend to the ground level. The upper end of the access container 60 is capped with a removable top cover 61.

Additional features can be incorporated in the UV disinfection device as described. For instance, a "lamp condition or status" circuit (either off or on) can be utilized to notify the operator if the lamp is not in the desired state (on or off). For instance, a UV sensitive photocell 90 can be placed in the upper shield 50 and wired to an alarm in the control panel to provide a remote lamp status indicator. UV photocells can readily burn out, and to extend photocell life, the portion of the UV tube aligned with the photocell can be wrapped in opaque material, such as stainless tape (not shown). The tape would extend above and below the area of the lamp aligned with the photocell, whereby the photocell responds to "indirect" UV light (light from below or above the tape and photocell). Alternatively, the photocell can be protected by a shield to absorb or reflect a portion of the UV radiation. For instance, an optical crystal shield from Edmund Industrial Optics in Barrington, N.J. has been found to slightly extend the life of the UV photocell (B270 window).

Alternatively, a current detection circuit could be used to detect the presence or absence of current to the lamp, and alarm accordingly. Obviously, the voltage or resistance on the lamp circuit could also be used in a "lamp status" circuit. All such circuits are considered "means to detect the status of the UV lamp" 70 (on or off, where off includes burned or missing lamps).

Additionally, in an aerated wastewater treatment system, or other treatment system where a source of air for injection can be supplied, an air injector 65 can be positioned near the bottom of the UV contact chamber 1. The air injector 65 would slowly or periodically release air (up to 5 cfm) to prevent sludge buildup in the bottom of the UV chamber 1, thus preventing flow obstruction in the opening between the first chamber 10 and second chamber 10. Generally, the required air delivery will be smaller than that utilized in an aerated treatment tank injection system, and a needle valve or other device could be utilized to reduce the flow rates to the UV contact chamber air injector 65. As shown, air injector is mounted through the wall of the chamber 1, but it could be fixedly mounted to the interior of the container with an air supply line disposed partially within the container. Incorporation of an air injector is useful for most UV contact chambers.

As described, the UV disinfection device is constructed from PVC tubing, but other materials (such as molded plastics, metals, concrete, etc. can be used, as well as shapes other than a chamber that is circular in cross section can be employed). Also, the partition, as described results from a "tube-in-tube" configuration, but a partitioned box, box-in-box, or other partitioned chambers can be built. It is desired, however, that the device be compact, resulting in a small foot print. For instance, to install the present UV disinfection device external to a treatment tank, a posthole digger can be used as the footprint of the contact chamber is a 6" diameter circle.

Operation of the Contact Chamber

In operation, one of the horizontal arms (12 or 13) of the exterior cross fitting 4 operates as the inlet to the device, while the other horizontal arm operates as the outlet from the device. There is no preferred orientation, and hence, no incorrect installation. Either horizontal arm of the cross 4 can operate as the inlet. For purposes of the following description, the cross fitting arm 12, connected to the first chamber 10, will be considered the inlet.

Wastewater enters the inlet side of the contact chamber through piping connected to cross fitting arm 12. Water then flows down into the first chamber 10, the annular volume between exterior PVC tube 2 and interior PVC tube 3, to travel upwardly in the interior volume of the interior PVC tube 3. During the upward leg, the water is exposed to UV radiation emitted by the UV lamp 30. Treated water then exits the UV contact chamber through the "T" fitting 6 and joined piping 7. Note that the partition 3 is used to ensure that a given volume of water has to pass the entire length of the UV lamp, thus assuring adequate exposure. Lacking a partition, there is a possibility for a given volume of water to pass from the inlet to the outlet, bypassing or short circuiting the UV lamp, an undesirable result. The device as described may not be installed horizontally, as there is no way to access the lamp for maintenance.

For maintenance, the operator removes the cap 61 of the access container, reaches into the access container and unplugs the lamp wiring from the connector 500, then slides the joined lamp assembly 31 and shield assembly (50 and 40) through the support disk 100 and out of the device for maintenance. Installation is the reverse.

As described, the UV disinfection device is easily assembled from readily available materials, is economic, and creates a very small footprint. It is to be understood that the present invention is not limited to the embodiments described above, but encompasses any and all embodiments within the scope of the following claims. For example, the contact chamber could be used to sterilize waters other than treated sewage.

We claim:

1. A wastewater UV disinfection device comprising a contact chamber comprising a container having an interior, a top portion and a bottom portion, a partition positioned in the interior to form a first and second chamber, said partition extending from said top portion toward said bottom portion of said contact container and terminating before said bottom portion thereby creating a non-restricted flow path for fluid communication between said first and second chambers, said first and second chamber each having a top chamber portion and a bottom chamber portion, each top chamber portion being positioned in said top portion of said container, and each bottom portion of said chamber being positioned in said bottom portion of said container, an inlet in one of said first or second chambers, said inlet formed in said container near said top portion, an outlet in the other of said first or second chambers, said outlet formed in said container near said top portion and a ultraviolet lamp positioned in one of said first or second chambers.

2. The wastewater UV disinfection device of claim 1 wherein said container is formed of PVC pipe, and said partition is formed of PVC pipe.

3. The wastewater UV disinfection device of claim 1 wherein said ultraviolet light has a status (lamp on or lamp off), and said UV disinfection device includes a means to detect said status.

4. The wastewater UV disinfection device of claim 2 wherein said partition forms nested first and second chambers in said container.

5. The wastewater UV disinfection device of claim 2 having an access container connected to said container, where said access container is adapted to provide access to said container through said access container.

6. A wastewater UV disinfection device according to claim 1 further having an air injector positioned to discharge air into the interior of the container.

7. A UV disinfection system according to claim 3 wherein said means to detect the lamp status includes a current detection circuit, a voltage detection circuit, or a resistance detection circuit.

8. A method of treating wastewater comprising flowing wastewater into a wastewater treatment and after treatment, flowing said treated wastewaters into a UV contact container, said container having a top portion and a bottom portion, said inlet and said outlet being positioned near said top portion, a partition positioned in the interior to form a first and second chamber, said partition extending from said top portion toward said bottom portion of said contact container and terminating before said bottom portion thereby creating a non-restricted flow path for fluid communication between said first and second chambers, said first and second chamber each having a top chamber portion and a bottom chamber portion, each top chamber portion being positioned in said top portion of said container, and each bottom portion of said chamber being positioned in said bottom portion of said container, an inlet in one of said first or second chambers, and a ultraviolet lamp positioned in only one of said first or second chambers, said wastewater flowing into said inlet, flowing sequentially between said first and second chambers, and exiting said outlet of said container, being irradiated by said UV light in only one of said first or second chambers.

* * * * *